(12) United States Patent
Stahl et al.

(10) Patent No.: US 12,469,858 B2
(45) Date of Patent: Nov. 11, 2025

(54) METHOD FOR PRODUCING A MULTI-LAYER BIPOLAR PLATE FOR AN ELECTROCHEMICAL DEVICE AND BIPOLAR PLATE FOR AN ELECTROCHEMICAL DEVICE

(71) Applicant: EKPO Fuel Cell Technologies GmbH, Dettingen (DE)

(72) Inventors: Peter Stahl, Metzingen (DE); Juergen Kraft, Metzingen (DE)

(73) Assignee: EKPO Fuel Cell Technologies GmbH, Dettingen (DE)

( * ) Notice: Subject to any disclaimer, the term of this patent is extended or adjusted under 35 U.S.C. 154(b) by 682 days.

(21) Appl. No.: 17/846,801

(22) Filed: Jun. 22, 2022

(65) Prior Publication Data

US 2022/0320533 A1    Oct. 6, 2022

Related U.S. Application Data

(63) Continuation of application No. PCT/EP2020/085117, filed on Dec. 8, 2020.

(30) Foreign Application Priority Data

Dec. 23, 2019   (DE) ..................... 10 2019 135 785.3

(51) Int. Cl.
  *H01M 8/0273*    (2016.01)
  *H01M 8/0206*    (2016.01)
  (Continued)

(52) U.S. Cl.
  CPC ....... *H01M 8/0273* (2013.01); *H01M 8/0206* (2013.01); *H01M 8/0258* (2013.01); *H01M 8/0297* (2013.01); *H01M 8/2418* (2016.02)

(58) Field of Classification Search
  CPC ............. H01M 8/0273; H01M 8/0206; H01M 8/0258; H01M 8/0297; H01M 8/2418; H01M 8/0267; H01M 8/0284; Y02E 60/50
  See application file for complete search history.

(56) References Cited

U.S. PATENT DOCUMENTS

2016/0006045 A1    1/2016  Zillich et al.
2017/0012301 A1    1/2017  Kraft et al.
(Continued)

FOREIGN PATENT DOCUMENTS

DE    10 2013 220486    4/2014
DE    10 2016 208378    11/2017
(Continued)

*Primary Examiner* — Helen Oi K Conley
(74) *Attorney, Agent, or Firm* — Womble Bond Dickinson (US) LLP

(57) ABSTRACT

A method for producing a multi-layer bipolar plate for an electrochemical device is disclosed. The method includes producing at least one sealing element made of an elastic material on a first bipolar plate layer of the bipolar plate; connecting the first bipolar plate layer with the sealing element produced thereon and a second bipolar plate layer of the bipolar plate by welding along at least one connection welding seam, in which method an impairment to the sealing element produced on the first bipolar plate layer as a result of a subsequent welding operation can be reliably avoided and the freedom of design of the electrochemical unit is preferably increased, and that during the welding operation, the second bipolar plate layer faces toward a welding energy source and that during the welding operation, a weld pool produced by the welding energy source does not completely penetrate the first bipolar plate layer.

14 Claims, 5 Drawing Sheets

(51) Int. Cl.
  *H01M 8/0258*  (2016.01)
  *H01M 8/0297*  (2016.01)
  *H01M 8/2418*  (2016.01)

(56) References Cited

U.S. PATENT DOCUMENTS

2019/0288299 A1  9/2019  Morozumi et al.
2020/0152953 A1  5/2020  Bayer et al.

FOREIGN PATENT DOCUMENTS

EP   3540839 A1 *  9/2019  .......... H01M 8/0297
JP   2007-026737   2/2007

\* cited by examiner

METHOD FOR PRODUCING A MULTI-LAYER BIPOLAR PLATE FOR AN ELECTROCHEMICAL DEVICE AND BIPOLAR PLATE FOR AN ELECTROCHEMICAL DEVICE

CROSS-REFERENCE TO RELATED APPLICATIONS

This application is a continuation of international application number PCT/EP2020/085117, filed on Dec. 8, 2020, and claims the benefit of German application number 10 2019 135 785.3, filed on Dec. 23, 2019, which applications are hereby incorporated by reference in their entirety in this application.

FIELD OF THE DISCLOSURE

The present invention relates to a method for producing a multi-layer bipolar plate for an electrochemical device, wherein the method comprises the following:
  producing at least one sealing element made of an elastic material on a first bipolar plate layer of the bipolar plate; and
  connecting the first bipolar plate layer of the bipolar plate with the sealing element produced thereon and a second bipolar plate layer of the bipolar plate by welding by means of a welding energy source along at least one connection welding seam.

The electrochemical device in which the bipolar plate is used preferably comprises a stack of a plurality of electrochemical units succeeding one another along a stack direction, each electrochemical unit comprising a bipolar plate.

The electrochemical device in which the produced bipolar plate is used is configured, e.g., as a fuel cell device, as an electrolyzer, or as a battery cell stack.

In known methods for producing a multi-layer bipolar plate in which a sealing element made of an elastic material is joined to one of the bipolar plate layers, the bipolar plate is constructed such that sealing lines and welding lines do not cross or contact one another, seen along the stack direction of the stack of electrochemical units, as this can leads to damage to the sealing element due to the input of heat during the welding operation.

In particular, a burning of the sealing element, a formation of bubbles in the material of the sealing element, and/or a contamination of the sealing element may occur.

When the sealing element is located on the side of the bipolar plate that faces away from the welding energy source, such damage to the sealing element can occur, in particular, by a weld pool, from which welding gases and/or welding dust escape, forming on the side of the bipolar plate on which the sealing element is arranged.

In addition, chips of welding residue, for example scale, can occur in the region of the connection welding seam, especially where there is a weld pool during the welding operation.

When there is a weld pool on the side of the bipolar plate on which the sealing element is arranged, no cleaning operation following the welding operation is possible on this side of the bipolar plate.

Contamination to the sealing element or a base material of the bipolar plate resulting from the welding operation may greatly influence the function of the electrochemical device. Such contamination can also lead to problems in the assembly of the electrochemical device, for example due to the creation of gaps between the components.

Because, in the known methods for producing a multi-layer bipolar plate, the welding seams and sealing lines of the bipolar plate neither cross, overlap, nor contact one another, seen along the stack direction, a spacing must be provided everywhere between the sealing lines and the welding seams, thereby increasing the space requirement for the sealing system and the system of the connection welding seams on the bipolar plate.

The freedom of design in the structure of the electrochemical unit is greatly limited by the requirement that the sealing lines and the connection welding seams are not permitted to cross.

The sealing element has a spatial extent laterally beyond the sealing line and optionally between a plurality of sealing lines and there can fulfill the function of electrical insulation.

In the known manufacturing methods, wherever there are connection welding seams on the bipolar plate, regions may arise in which there is risk of an electrically conductive contact of two adjacent electrochemical units in the stack direction due to the lack of sealing material, which results in a reduced insulation resistance or even a short circuit between the electrochemical units. This poses a problem for safety in operation of the electrochemical device.

SUMMARY OF THE INVENTION

In accordance with an embodiment of the invention, a method is created for producing a multi-layer bipolar plate for an electrochemical device of the kind stated at the outset in which an impairment to a sealing element produced on the first bipolar plate layer as a result of a subsequent welding operation can be reliably avoided and the freedom of design in the structure of the electrochemical unit is preferably increased.

In accordance with an embodiment of the invention, a method with the features of the preamble of claim 1 is provided in which during the welding operation, the second bipolar plate layer faces toward the welding energy source and during the welding operation, a weld pool created by means of the welding energy source does not completely penetrate the first bipolar plate layer.

The concept underlying the present invention is thus to design the first bipolar plate layer and the second bipolar plate layer and/or to carry out the welding operation in such a way that the weld pool is located only on the side of the bipolar plate facing toward the welding energy source during the welding operation. The side of the bipolar plate layer, facing away from the welding energy source, on which the sealing element is arranged remains undamaged. In particular, no weld bead, contamination or scale forms on this side.

Should contamination arise on the side of the bipolar plate facing toward the welding energy source during the welding operation, it can be removed after the welding operation by a cleaning operation, because there is no elastic sealing material on this side of the bipolar plate.

In a preferred embodiment of the invention, provision is made that the material thickness $H_1$ of the first bipolar plate is greater than the material thickness $H_2$ of the second bipolar plate layer in the region of the connection welding seam.

In a particular embodiment of the invention, provision is further made that a thermal conduction coating is provided in the region of the connection welding seam.

The material of the thermal conduction coating has a higher thermal conductivity than the material of the first bipolar plate layer and/or than the material of the second bipolar plate layer.

The thermal conduction coating on the first bipolar plate is preferably formed before the first bipolar plate layer is welded to the second bipolar plate layer.

In a preferred embodiment of the invention, provision is made that a sealing line of the sealing element on the first bipolar plate layer does not overlap with the connection welding seam, seen along the stack direction of the electrochemical device.

In particular, provision may be made that a sealing line of the sealing element on the first bipolar plate layer crosses or contacts the connection welding seam, seen along the stack direction of the electrochemical device.

Because the sealing lines and connection welding seams are able to cross, overlap and/or contact one another, seen in the stack direction, the distance between the connection welding seams and the sealing lines on the bipolar plate can be significantly reduced. The results in greater freedoms in the design of the structure of the electrochemical unit. The space requirement for accommodating the sealing system and the system of the connection welding seams can be considerably reduced.

In an alternative embodiment of the method in accordance with the invention, provision may be made, however, that no sealing line of the sealing element on the first bipolar plate overlaps, crosses, intersects and/or contacts the connection welding seam, seen along the stack direction of the electrochemical device.

By means of this measure, the risk of damage to the sealing element as a result of the welding heat arising during the welding operation can be even further reduced.

In a preferred embodiment of the invention, provision is made that the sealing element has at least one sealing lip.

In particular, provision may be made that the sealing element has at least two sealing lips and a seal intermediate region arranged between the sealing lips. Such a seal intermediate region can at least partially, preferably substantially completely, cover the connection welding seam, seen along the stack direction of the electrochemical device. By means of this seal intermediate region, the insulation resistance between two adjacent electrochemical units can be increased and/or an electrically conductive contact of two successive electrochemical units another along the stack direction can be prevented.

Such a seal intermediate region can further prevent that during the welding operation gases or the like escape through the surface of the first bipolar plate layer facing away from the welding energy source.

In a preferred embodiment of the invention, provision is made that at least one sealing line of the sealing element surrounds a medium channel of the electrochemical device, an electrochemically active region of an electrochemical unit of the electrochemical device, and/or a flow field of the electrochemical device.

Such a medium channel preferably extends substantially in parallel to the stack direction through the electrochemical device.

Such a medium channel serves to supply a fluid medium required for the operation of the electrochemical device, for example an anode gas, a cathode gas, or a cooling medium, to the electrochemical units of the electrochemical device or to discharge such a fluid medium, for example an anode gas, a cathode gas, or a cooling medium, from the electrochemical units of the electrochemical device.

In a preferred embodiment of the invention, provision is made that the sealing element is produced on the side of the bipolar plate layer that faces away from the second bipolar plate layer in the assembled state of the electrochemical device.

Provision is preferably made that no sealing element made of an elastic material is produced on the side of the first bipolar plate layer that faces toward the second bipolar plate layer in the assembled state of the electrochemical device.

Further, provision may be made that no sealing element made of an elastic material is produced on the second bipolar plate layer.

In principle, provision may be made, however, that a sealing element made of an elastic element is formed on the side of the first bipolar plate layer that faces toward the second bipolar plate layer and/or on the second bipolar plate layer, which sealing element may serve, e.g., to electrically insulate between two adjacent bipolar plates within the electrochemical device, damage to regions of this sealing element then being accepted.

The first bipolar plate layer is preferably made of a first metallic material and the second bipolar plate layer is preferably made of a second metallic material.

In principle, provision may be made that the first metallic material and the second metallic material are identical to one another.

It has proven to be particularly favorable, though, if the first metallic material is different from the second metallic material and, in particular, has a greater thermal conductivity than the second metallic material.

The present invention further relates to a bipolar plate for an electrochemical device, which comprises a first bipolar plate layer on which a sealing element made of an elastic material is formed and a second bipolar plate layer that is connected to the first bipolar plate layer by welding along at least one connection welding seam.

The sealing element preferably comprises an elastomer material and is particularly preferably made substantially entirely of an elastomer material.

The sealing element may be produced on the first bipolar plate, for example, by means of an injection molding operation, by means of a pattern printing operation, in particular a screen printing operation, or by means of a dispenser application operation.

The present invention makes it possible to join a sealing element to a bipolar plate layer of a bipolar plate in an operation with relatively little effort and to connect the bipolar plate layer that is provided with the sealing element with a further bipolar plate layer in a subsequent welding operation to form an at least two-layer bipolar plate.

Sealing material may be provided in the region of the connection welding seam on one side of the bipolar plate or on two sides of the bipolar plate, which sealing material prevents the leakage of contaminants during the welding operation, such that a contamination of components of the electrochemical unit is prevented and an elaborate cleaning of the bipolar after the welding operation becomes unnecessary.

The connection welding seam, i.e., the region in which the weld pool is located during the welding operation, extends along the stack direction of the electrochemical units of the electrochemical device over a height Hs, which is smaller than the sum of the material thickness $H_1$ of the first bipolar plate layer and the material thickness $H_2$ of the second bipolar plate layer in the region of the connection welding seam.

The connection welding seam thus completely penetrates the bipolar plate layer that faces toward the welding energy source during the welding operation but only partially penetrates the bipolar plate layer that faces away from the welding energy source during the welding operation.

The welding energy source may, in particular, comprise a laser and/or be configured as a laser.

The thermal conduction coating may be applied only in regions or over the entire surface to the first bipolar plate layer or to the second bipolar plate layer.

In a preferred embodiment of the invention, provision is made that the at least one sealing element that is materially bonded to the bipolar plate is provided for the sealing of a medium channel of the electrochemical device.

A sealing element, which seals off the electrochemically active region of an electrochemical unit and/or a flow field of the electrochemical unit from a medium channel, from another flow field, and/or from the outside space of the electrochemical device, may, for example, be joined to a constituent part of a membrane electrode assembly of the electrochemical unit, in particular to a gas diffusion layer.

Such a flow field sealing element may, in particular, be of two-part configuration, wherein an anode-side part of the sealing element is joined to the anode-side gas diffusion layer and a cathode-side part of the sealing element is joined to the cathode-side gas diffusion layer.

Upon assembly of the electrochemical device, a membrane, for example a membrane coated with a catalyst, is placed between the anode-side part of the sealing element and the anode-side gas diffusion layer on the one hand and the cathode-side part of the sealing element and the cathode-side gas diffusion layer on the other hand.

The electrochemical device in which the bipolar plate in accordance with the invention is used preferably comprises at least one polymer electrolyte membrane (PEM).

In a preferred embodiment of the invention, a sealing element is applied to a first bipolar plate layer of a bipolar plate for an electrochemical device, and in a subsequent welding operation said bipolar plate layer is welded to a further bipolar plate layer such that the connection welding seams and the sealing lines of the sealing elements produced on the first bipolar plate layer lie on top of one another, cross, or at least partially overlap or contact one another, seen along the stack direction of the electrochemical device.

Further features and advantages of the invention are subject matter of the subsequent description and the graphical representation of exemplary embodiments.

BRIEF DESCRIPTION OF THE DRAWINGS

The same or functionally equivalent elements are provided with the same reference numerals in all Figures.

DETAILED DESCRIPTION OF THE INVENTION

Figure 1:
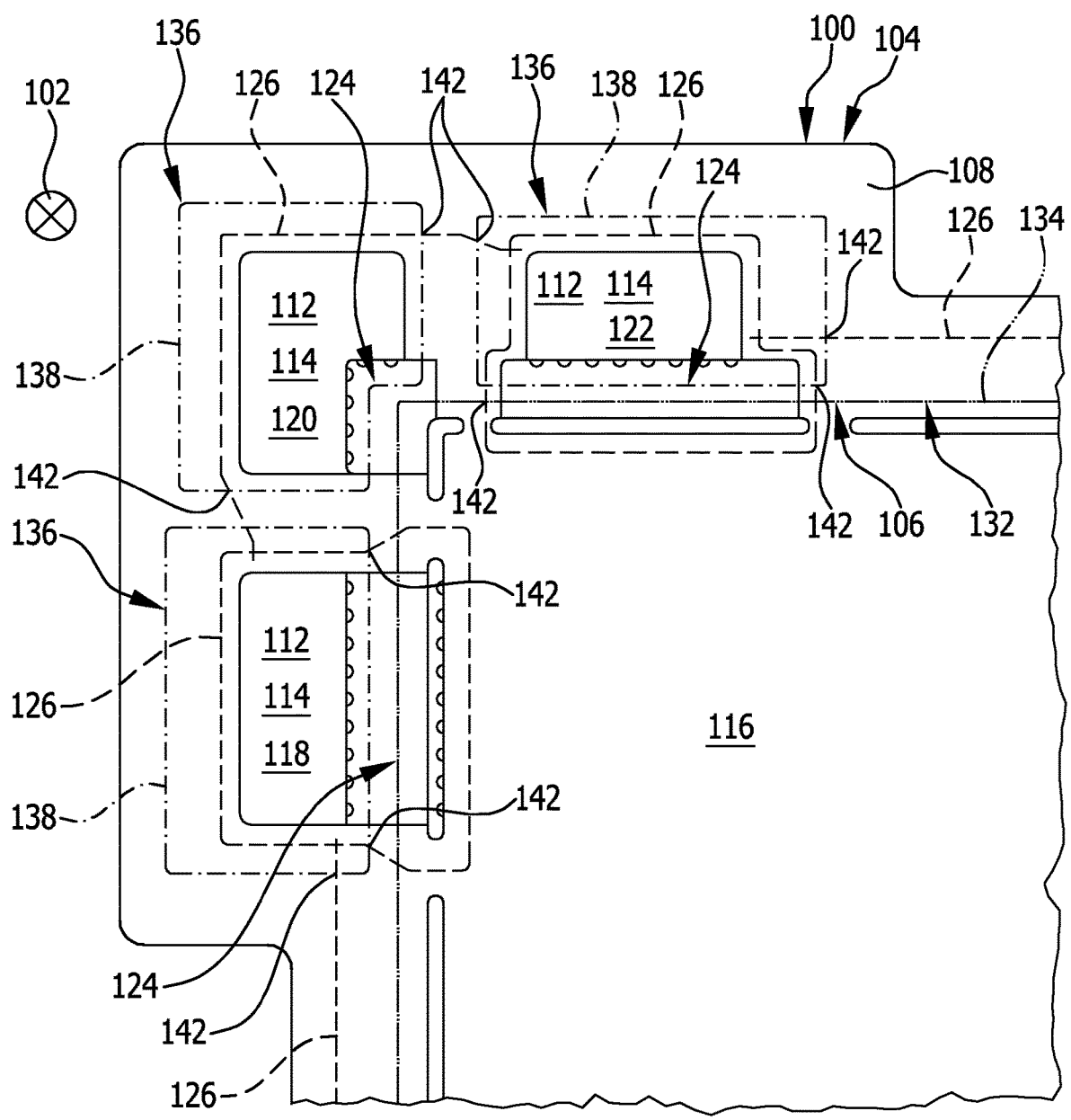
FIG. 1 shows a sectional schematic plan view of a bipolar plate of an electrochemical unit of an electrochemical device comprising a plurality of electrochemical units succeeding one another along a stack direction, in the region of a cathode gas supply channel, a cooling medium supply channel, and an anode gas discharge channel.
Figure 2:
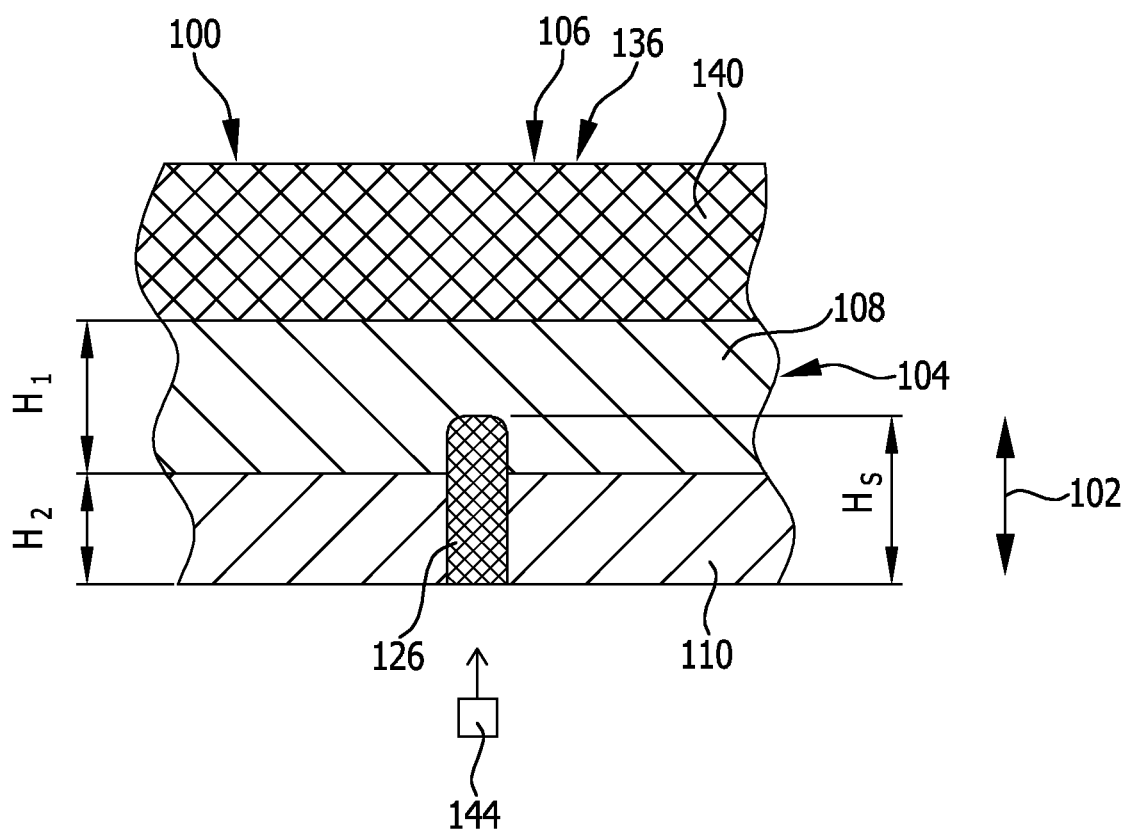
FIG. 2 shows a sectional schematic cross section through the bipolar plate from FIG. 1 in the region of a connection welding seam, by which a first bipolar plate layer and a second bipolar plate layer of the bipolar plate are connected to one another.

An electrochemical device, for example a fuel cell device or an electrolyzer, which is depicted in FIGS. 1 and 2 and is denoted as a whole with 100, comprises a stack that comprises a plurality of electrochemical units, for example fuel cell units or electrolyzer units, succeeding one another in a stack direction 102, and a clamping device (not depicted) for acting upon the electrochemical units with a clamping force directed along the stack direction 102.

Each electrochemical device of the electrochemical device 100 comprises a respective bipolar plate 104, a membrane electrode assembly (MEA), which is not depicted, and a sealing system 106.

The membrane electrode assembly comprises, e.g., a catalyst-coated membrane (CCM) and two gas diffusion layers, wherein a first gas diffusion layer is arranged on the anode side and a second gas diffusion layer is arranged on the cathode side.

The bipolar plate 104 comprises a first bipolar plate layer 108 and a second bipolar plate layer 110 (see FIG. 2).

The first bipolar plate layer 108 is preferably made of a first metallic material and the second bipolar plate layer 110 is preferably made of a second metallic material.

The first metallic material preferably has a greater thermal conductivity than the second metallic material.

The bipolar plate 104 has a plurality of medium passage openings 112, through which in each case a fluid medium to be supplied to the electrochemical device 100 (in the case of a fuel cell device e.g., an anode, a cathode gas, or a cooling medium) is able to pass through the bipolar plate 104.

The medium passage openings 112 of the bipolar plates 104 succeeding one another in the stack and the interspaces located between the medium passage openings 112 in the stack direction 102 together each form a respective medium channel 114.

Each medium channel 114 by means of which a fluid medium is suppliable to the electrochemical device 100 is associated with at least one other medium channel 114 by means of which the respective fluid medium is dischargeable from the electrochemical device 100.

By means of a flow field 116 located therebetween, which is preferably formed on a surface of an adjacent bipolar plate 104 or (for example in the case of a cooling medium flow field) in the interspace between the first bipolar plate layer 108 and the second bipolar plate layer 110 of the multi-layer bipolar plate 104, the medium is able to flow transversely, preferably substantially perpendicularly, to the stack direction 102 from the first medium channel 114 to the second medium channel 114.

Depicted in FIG. 1 is, e.g., a medium channel 118 for a cathode gas of the electrochemical device 100, a medium channel 120 for a cooling medium of the electrochemical device 100, and a medium channel 122 for an an anode gas of the electrochemical device 100.

Each medium channel 114 is in fluidic connection with the respectively associated flow field 116 by means of a respective flow port 124.

The first bipolar plate layer 108 and the second bipolar plate layer 110 of the bipolar plate 104 are fixed to one another in a materially bonded and fluid-tight manner, preferably by laser welding, along connection welding seams 126, which are depicted in FIG. 1 with broken lines.

Undesired leakage of the fluid media from the medium channels 114 and the flow fields 116 of the electrochemical device 100 is prevented by the sealing system 106.

The sealing system 106 comprises a flow field sealing arrangement 132, which extends around the flow fields 116. The sealing lines 134 of said flow field sealing arrangement 132 are depicted in the plan view of FIG. 1 by means of dashed-double point lines.

Further, the sealing system 106 comprises a plurality of medium channel sealing arrangements 136, which each extend around a medium channel 114. The sealing lines 138 of said medium channel sealing arrangements 136 are depicted in the plan view of FIG. 1 by means of dot-dash lines.

The flow field sealing arrangement 132 may comprise a first flow field sealing element, which is fixed to a (for example anode-side) first gas diffusion layer, and a second flow field element, which is fixed to a (for example cathode-side) second gas diffusion layer.

The flow field sealing elements are preferably produced on the respectively associated gas diffusion layer by means of an injection molding operation, a pattern printing operation, in particular a screen printing operation, or a dispenser application operation.

The flow field sealing elements preferably comprise an elastomer material and may, in particular, be made substantially entirely of an elastomer material.

Each of the flow field sealing elements, in the assembled state of the electrochemical device 100, abuts against a respective bipolar plate layer 108 or 110 in a fluid-tight manner, without being fixed to the respective bipolar plate layer 108 or 110.

Each of the medium channel sealing arrangements 136 comprises a respective sealing element 140, which is fixed to the side of the first bipolar plate layer 108 facing away from the second bipolar plate layer 110.

In the assembled state of the electrochemical device 100, the sealing element 140 abuts in a fluid-tight manner against the bipolar plate 104 of an adjacent electrochemical unit in the stack direction 102.

The sealing element 140 may be produced on the first bipolar plate layer 108, for example, by means of an injection molding operation, a pattern printing operation, in particular a screen printing operation, or a dispenser application operation.

The sealing element 140 preferably comprises an elastomer material and may, in particular, be made substantially entirely of an elastomer material.

The sealing element 140 has been produced on the first bipolar plate layer 108 before the first bipolar plate layer 108 and the second bipolar plate layer 110 have been fixed to one another.

The connection welding seams 126 along which the first bipolar plate layer 108 and the second bipolar plate layer 110 are fixed to one another intersect with the sealing elements 140 of the medium channel sealing arrangements 136 at points of intersection 142, seen along the stack direction 102 (see FIG. 1).

Because the connection welding seams 126 and the sealing elements 140 are able to cross, overlap, and contact one another (seen in the stack direction 102), and because no minimum distance between the connection welding seams 126 on the one hand and the sealing elements 140 on the other hand perpendicular to the stack direction 102 has to be maintained, there is large degree of freedom in the design of the structure of the bipolar plate 104 and the electrochemical units of the electrochemical device 100. The space requirement for the sealing elements 140 and the connection welding seams 126 can be significantly reduced.

Additional sealing intermediate regions may be provided between the sealing lines 138 of the sealing elements 140 on the side of the first bipolar plate layer 108 facing away from the second bipolar plate layer 110, which sealing intermediate regions prevent an electrically conductive contact between two adjacent electrochemical units in the stack and/or increase the electrical insulation resistance between two adjacent electrochemical units in the stack.

To produce the bipolar plate 104, described above, for the electrochemical device 100, one proceeds as follows:

The sealing elements 140 made of an elastic material, preferably of an elastomer material, are produced on the first bipolar plate layer 108.

The sealing elements 140 are preferably produced on the first bipolar plate layer 108 by means of an injection molding operation.

Alternatively hereto, provision may also be made that the sealing elements 140 are produced on the first bipolar plate layer 108 by means of a pattern printing operation, in particular a screen printing operation, or a dispenser application operation.

After the production of the sealing elements 140 on the first bipolar plate layer 108, the first bipolar plate layer 108 is connected to the second bipolar plate layer 110 by welding, in particular by laser welding, along the connection welding seams 126.

Here, the first bipolar plate layer 108 is positioned on the second bipolar plate layer 110 such that the sealing elements 140 formed on the first bipolar plate layer 108 are arranged on the side of the first bipolar plate layer 108 facing away from the second bipolar plate layer 110.

The welding operation is performed such that a welding energy source 144 (see FIG. 2), in particular a laser, is arranged on the side of the second bipolar plate layer 110 facing away from the first bipolar plate layer 108, such that the second bipolar plate layer 110 faces toward the welding energy source 144 during the welding operation.

Further, the welding operation is performed such that a weld pool produced by means of the welding energy source in the material of the second bipolar plate layer 130 and in the material of the first bipolar plate layer 108 completely penetrates the second bipolar plate layer 110 but does not completely penetrate the first bipolar plate layer 108.

A connection welding seam 126 is thus formed, the penetration depth Hs of which is greater than the material thickness $H_2$ of the second bipolar plate layer 110 in the region of the connection welding seam 126, but smaller than the sum of the material thickness $H_2$ of the second bipolar plate layer 110 and the material thickness $H_1$ of the first bipolar plate layer 108 in the region of the connection welding seam 126.

The sealing element 140 formed on the first bipolar plate layer 108, which crosses the connection welding seam 126, seen along the stack direction 102 (see FIG. 2), thus remains undamaged.

No weld bead, no contamination, and no scale form on the side of the first bipolar plate layer 108 facing away from the second bipolar plate layer 110.

Contamination that arises during the welding operation on the side of the second bipolar plate layer 110 facing toward the welding energy source 144 can be easily removed after the welding operation by a cleaning process, since no material of a sealing element 140 is found there.

The material thickness $H_1$ of the first bipolar plate layer 108 in the region of the connection welding seam 126 is preferably greater than the material thickness $H_2$ of the second bipolar plate layer 110 in the region of the connection welding seam 126.

Figure 3:
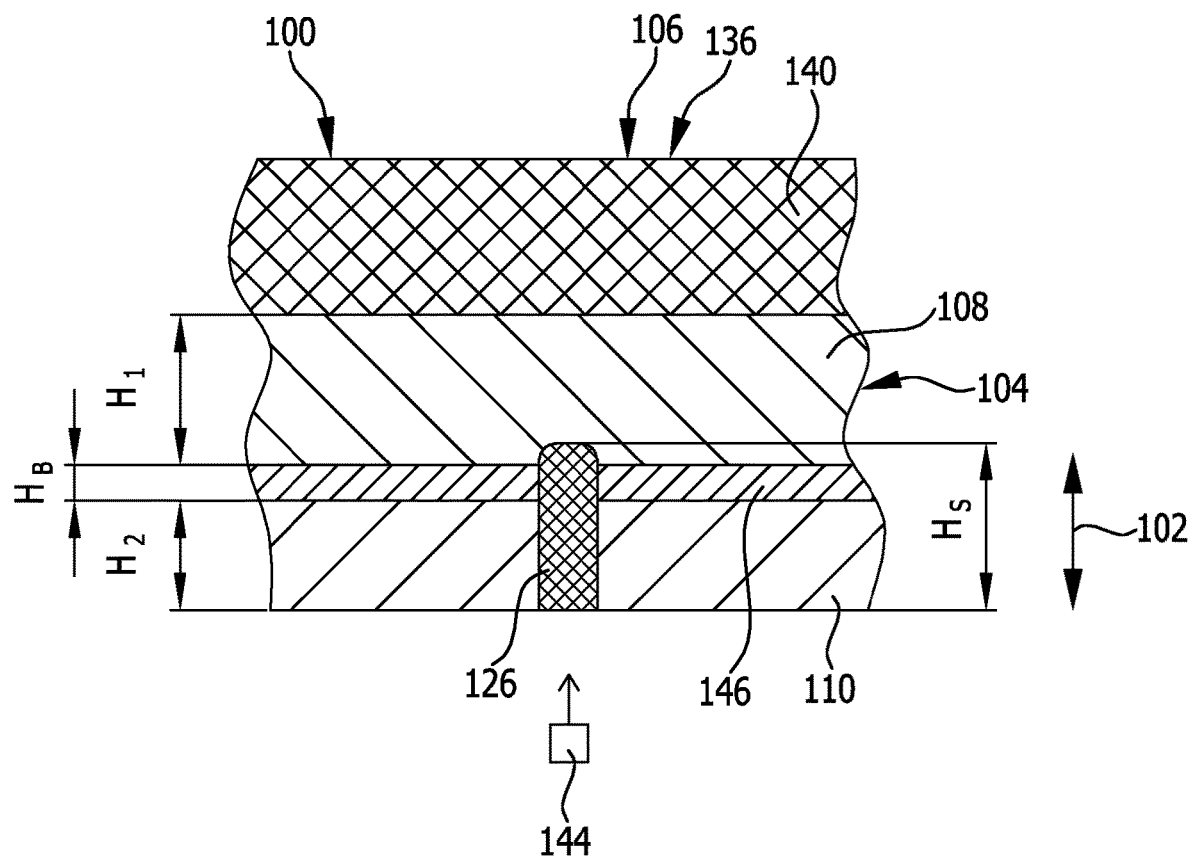
FIG. 3 shows a schematic cross section corresponding to FIG. 2 through a second embodiment of the bipolar plate in which a thermal conduction coating is provided between the first bipolar plate layer and the second bipolar plate layer.

A second embodiment depicted in sections in FIG. 3 of a bipolar plate 104 for an electrochemical device 100 differs from the first embodiment depicted in FIGS. 1 and 2 in that a thermal conduction coating 146 is provided between the first bipolar plate layer 108 and the second bipolar plate layer 110.

Provision is preferably made that the thermal conduction coating 146 is formed on the side of the first bipolar plate layer 108 of the bipolar plate 104 that faces toward the second bipolar plate layer 110.

The material of the thermal conduction coating 146 has a thermal conductivity that is greater than the thermal conductivity of the first material from which the first bipolar plate layer 108 is made.

The thermal conductivity of the material of the thermal conduction coating 146 is preferably also greater than the thermal conductivity of the second material from which the second bipolar plate layer 110 is made.

In all other respects, the second embodiment depicted in FIG. 3 of a bipolar plate 104 for an electrochemical device 100 corresponds with respect to structure, function, and production method with the first embodiment depicted in FIGS. 1 and 2, to the preceding description of which reference is made in this regard.

Figure 4:
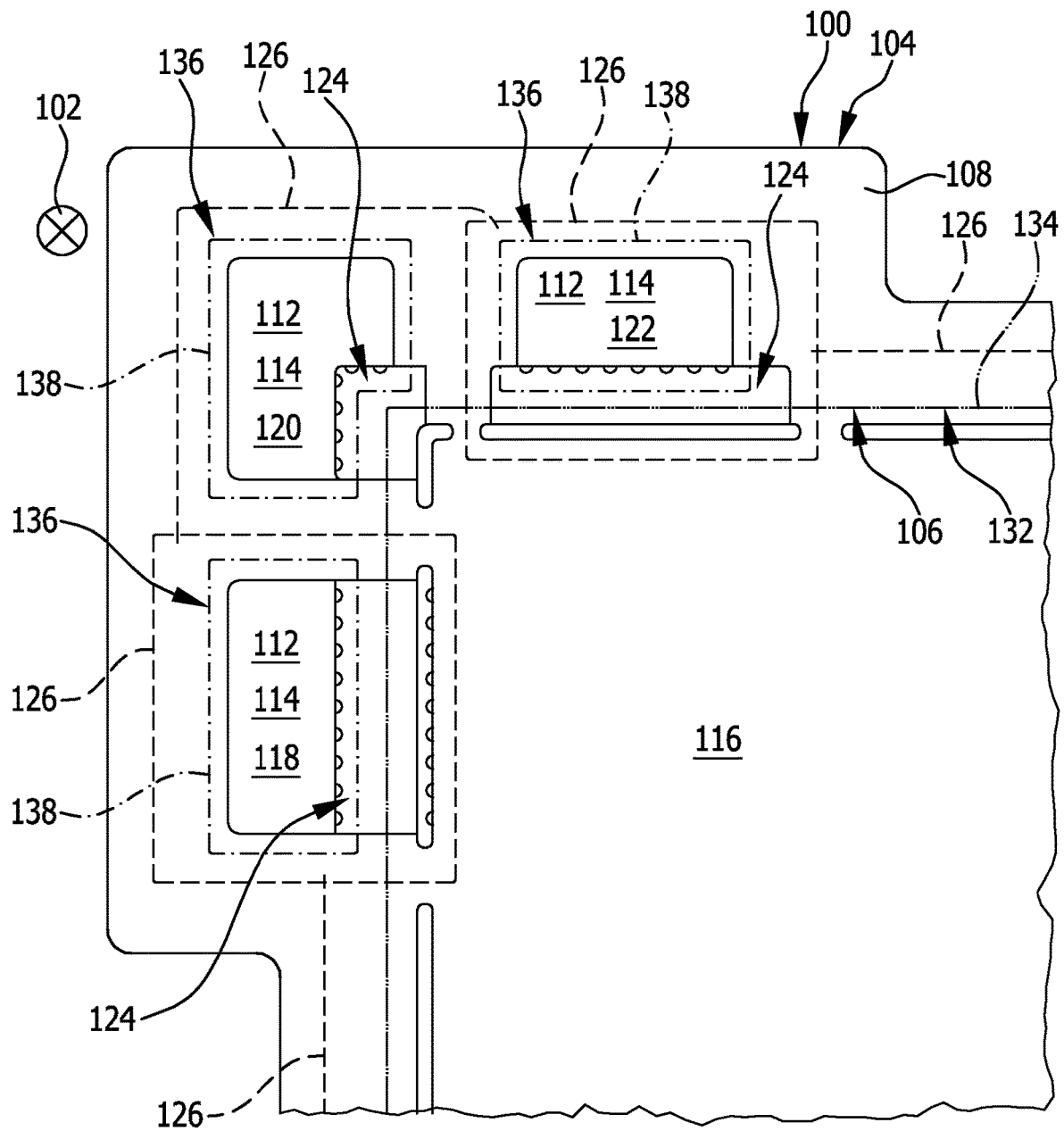
FIG. 4 shows a sectional schematic plan view of a third embodiment of a bipolar plate of an electrochemical unit of an electrochemical device comprises a plurality of electrochemical units succeeding one another along a stack direction, in the region of a cathode gas supply channel, a cooling medium supply channel, and an anode gas discharge channel.
Figure 5:
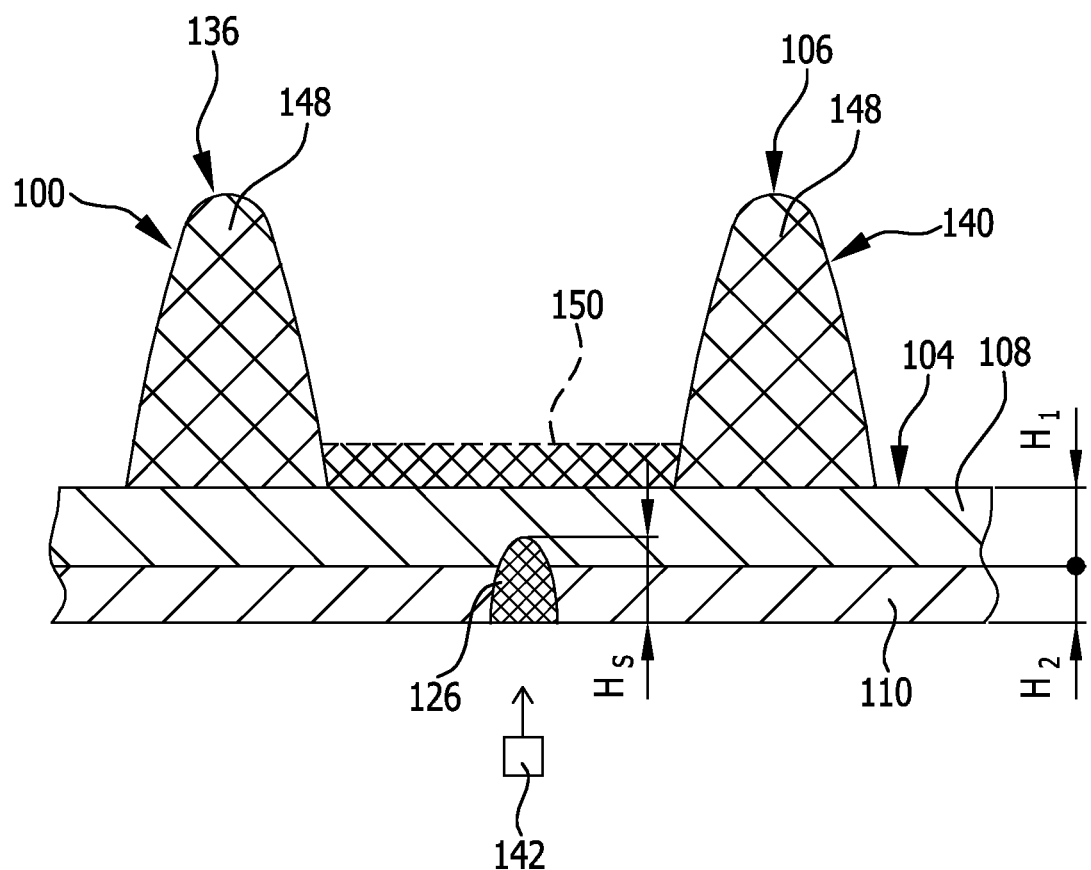
FIG. 5 shows a sectional schematic cross section through the bipolar plate from FIG. 4 in the region of a connection welding seam, by which a first bipolar plate layer and a second bipolar plate layer of the bipolar plate are connected to one another.

A third embodiment depicted in sections in FIGS. 4 and 5 of a bipolar plate 104 for an electrochemical device differs from the first embodiment depicted in FIGS. 1 and 2 in that the connection welding seams 126 along which the first bipolar plate layer 108 and the second bipolar plate layer 110 are fixed to one another do not cross the sealing lines 138 of the sealing elements 140 on the first bipolar plate 108, seen along the stack direction 102, thereby reducing a risk of damage to the sealing elements 140 as a result of the welding heat that arises during the welding operation.

The sealing element 140 may have one or more sealing lips 148.

A sealing intermediate region 150 may be provided between two sealing lips 148, in which region the sealing element 140 has a smaller height (extent along the stack direction 102) than in the region of the sealing lips 148.

In particular, provision may be made that such a seal intermediate region 150 at least partially, preferably substantially completely, covers the connection welding seam 126 (see FIG. 5).

Such a seal intermediate region 150 protects against an electrically conductive contact of two adjacent bipolar plates 104 in the stack.

Because the seal intermediate region 150 at least partially or fully covers the connection welding seam 126 (seen in the stack direction 102), it can be prevented that during the welding operation contaminants, for example gases, leak through the surface 152 of the first bipolar plate layer 108 facing away from the second bipolar plate layer 110 in the region of the connection welding seam 126.

In this embodiment, the material thickness $H_1$ of the first bipolar plate layer 108 in the region of the connection welding seam 126 may be greater than the material thickness $H_2$ of the second bipolar plate layer 110 in the region of the connection welding seam 126, equally as great as the material thickness $H_2$ of the second bipolar plate layer 110 in the region of the connection welding seam 126, or smaller than the material thickness $H_2$ of the second bipolar plate layer 110 in the region of the connection welding seam 126.

In all other respects, the third embodiment depicted in FIGS. 4 and 4 of the bipolar plate 104 for an electrochemical device 100 corresponds with respect to structure, function, and production method with the first embodiment depicted in FIGS. 1 and 2, to the preceding description of which reference is made is this regard.

The invention claimed is:

1. A method for producing a multi-layer bipolar plate for an electrochemical device, comprising the following:
   producing at least one sealing element made of an elastic material on a first bipolar plate layer of the bipolar plate;
   connecting the first bipolar plate layer of the bipolar plate with the sealing element produced thereon and a second bipolar plate layer of the bipolar plate by welding by means of a welding energy source along at least one connection welding seam;
   wherein
   during the welding operation, the second bipolar plate layer faces toward the welding energy source and wherein during the welding operation, a weld pool produced by means of the welding energy source does not completely penetrate the first bipolar plate layer.

2. The method in accordance with claim 1, wherein in the region of the connection welding seam, the material thickness of the first bipolar plate layer is greater than the material thickness of the second bipolar plate layer.

3. The method in accordance with claim 1, wherein a thermal conduction coating is provided in the region of the connection welding seam.

4. The method in accordance with claim 3, wherein the thermal conduction coating is formed on the first bipolar plate layer.

5. The method in accordance with claim 1, wherein a sealing line of the sealing element on the first bipolar plate layer overlaps with the connection welding seam.

6. The method in accordance with claim 1, wherein no sealing line of the sealing element on the first bipolar plate layer overlaps with the connection welding seam.

7. The method in accordance with claim 1, wherein the sealing element has at least one sealing lip.

8. The method in accordance with claim 7, wherein the sealing element has at least two sealing lips and a seal intermediate region arranged between the sealing lips.

9. The method in accordance with claim 8, wherein the seal intermediate region at least partially covers the connection welding seam.

10. The method in accordance with claim 1, wherein at least one sealing line of the sealing element surrounds a medium channel of the electrochemical device.

11. The method in accordance with claim 1, wherein the sealing element is produced on the side of the first bipolar plate layer that faces away from the second bipolar plate layer in the assembled state of the electrochemical device.

12. The method in accordance with claim 1, wherein no sealing element made of an elastic material is produced on the side of the first bipolar plate layer that faces toward the second bipolar plate layer in the assembled state of the electrochemical device.

13. The method in accordance with claim 1, wherein no sealing element made of an elastic material is produced on the second bipolar plate layer.

14. The method in accordance with claim 1, wherein the first bipolar plate layer is made of a first metallic material and the second bipolar plate layer is made of a second metallic material, wherein the first metallic material has a higher thermal conductivity than the second metallic material.

* * * * *